(12) United States Patent
Walton et al.

(10) Patent No.: US 7,484,070 B1
(45) Date of Patent: Jan. 27, 2009

(54) SELECTIVE MEMORY BLOCK REMAPPING

(75) Inventors: Derek T. Walton, Bolton, MA (US);
Carl M. Mikkelsen, Wayland, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 364 days.

(21) Appl. No.: 11/032,456

(22) Filed: Jan. 10, 2005

Related U.S. Application Data

(60) Provisional application No. 60/535,396, filed on Jan. 9, 2004.

(51) Int. Cl.
*G06F 12/00* (2006.01)
*G06F 13/00* (2006.01)

(52) U.S. Cl. ............... 711/202; 711/100; 711/154; 711/200

(58) Field of Classification Search ............ 711/3, 711/100, 154, 200, 202, 203
See application file for complete search history.

(56) References Cited

U.S. PATENT DOCUMENTS

| | | | |
|---|---|---|---|
| 5,907,856 A | | 5/1999 | Estakhri et al. |
| 6,262,918 B1 | | 7/2001 | Estakhri et al. |
| 6,411,546 B1 | | 6/2002 | Estakhri et al. |
| 6,587,382 B1 | | 7/2003 | Estakhri et al. |
| 6,711,059 B2 | | 3/2004 | Sinclair et al. |
| 6,725,321 B1 | | 4/2004 | Sinclair et al. |
| 6,751,155 B2 | | 6/2004 | Gorobets |
| 6,898,662 B2 | | 5/2005 | Gorobets |
| 6,978,342 B1 | | 12/2005 | Estakhri et al. |
| 7,111,140 B2 | | 9/2006 | Estakhri et al. |
| 2004/0044806 A1* | | 3/2004 | Moll et al. .............. 710/3 |
| 2004/0064668 A1* | | 4/2004 | Kjos et al. .............. 711/202 |
| 2004/0078631 A1* | | 4/2004 | Rogers et al. ............ 714/5 |

OTHER PUBLICATIONS

Solomon, Marvin. "CS 537: Lecture Notes, Part 8: Segmentation". Lecture Notes on Operating Systems. Updated Jan. 18, 1999. Accessed Sep. 21, 2006. http://web.archive.org/web/19990203161536/http://www.cs.wisc.edu/~solomon/cs537/segmentation.html.*

Shalan, Mohamed. "Hardware Support for Real-Time Embedded Multiprocessor System-on-a-Chip Memory Management". Proceedings of the tenth international symposium on Hardware/software codesign. ACM Press, May 2002. pp. 79-84.*

Joos, M. "Allocation of contiguous memory in LynxOS and Linux: the UIO package". Jun. 2000. pp. 1-19 http://rd13doc.cern.ch/Atlas/postscript/Note153.ps.*

* cited by examiner

*Primary Examiner*—Tuan V. Thai
(74) *Attorney, Agent, or Firm*—John R. Thompson; Stoel Rives LLP

(57) ABSTRACT

A memory of allocating memory for use by a subfunction of a computer chip, wherein the subfunction uses contiguous memory regions, the method comprising the steps of (a) creating a placeholder for contiguous memory buffers used by the subfunction of the chip by reserving a region of memory subsystem space, wherein the region does not need to be backed by true physical storage and the size is at least as large as the contiguous memory buffer required by the subfunction, (b) allocating pages of remaining memory in the memory subsystem to satisfy the amount of memory required by the subfunction, wherein the allocated pages do not necessarily result in a contiguous memory region, (c) remapping the allocated pages of step b into a contiguous region of the placeholder created in step a and (d) disabling the remapping after the subfunction is completed to free the memory in the placeholder.

19 Claims, 2 Drawing Sheets

SELECTIVE MEMORY BLOCK REMAPPING

REFERENCE TO PENDING PRIOR PATENT APPLICATION

This patent application claims benefit of pending prior U.S. Provisional Patent Application Ser. No. 60/535,396, filed Jan. 9, 2004 by Derek T. Walton et al. for SELECTIVE MEMORY BLOCK REMAPPING.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application-Specific Integrated Circuit) such as those produced by Oasis Semiconductor, Inc. of Waltham, Mass.

The Problem of Memory Allocation

Computer systems often have a limited amount of memory which must be used for different purposes at different stages of an information processing pipeline. Usually also, one computer system must perform several functions, each of which requires a unique apportionment of memory for best performance.

Accordingly, one of the critical design decisions affecting system performance is how the limited system memory will be allocated, to which function, and when.

The problem is compounded in SoC ASICs for MFPs because many of the functional units require memory areas which are contiguous. In other words, is not sufficient to have (for example) one megabyte of memory available, but the megabyte must be accessible in adjacent memory locations beginning at some base address B through $B+2^{10}-1$.

Prior Approaches

Basic Approach

Before this invention, the firmware used a two-step memory allocation strategy.

1. Before the system performs any actions which use memory buffers, based on many system-level parameters, determine how much each of the hardware functional units will need for fixed, contiguous memory buffers, and allocate these buffers.
   ○ Allocation can be done at compilation time, or
   ○ Allocation can be done a run time before the functional units are activated.
2. The remaining memory is divided into conveniently sized "pages". These pages are allocated as needed for memory uses which do not need to be contiguous.

The problem with this strategy is that the contiguous memory buffer sizes must be determined before the dynamic requirements are known. For instance, if a very large buffer is required to optimize the speed of scanning to the PC, then less memory is available to store images being held for collated printing—even though there may be no scanning being performed to the PC at that time.

One solution to this problem would be to completely reconfigure memory whenever the dynamic situation changes. The problem is that it is precisely at the point where the dynamic situation is changing that is it impossible to reconfigure the memory. Once pages have been allocated, there is a high probability that there is no longer sufficient contiguous memory available.

This problem is referred to in the computer science literature as fragmentation.

CPU MMU Does Not Solve the Problem

Adding a memory management unit (MMU) to the CPU does not solve the problem. Although MMUs are often used so that individual software processes have a contiguous view of their memory space, the MMU does not manage the memory space as seen by subfunctions of the SOC which are NOT part of the CPU core.

BRIEF DESCRIPTION OF THE DRAWINGS

The detailed description that follows makes reference, by way of example embodiments, to the following drawings in which.

THE INVENTION

The invention here disclosed solves the problem of contiguous memory allocation by restructuring the memory channel so that a portion—but not all—of the memory address space can be remapped. This remapping is performed at a location within the memory subsystem such that all subfunctions (functional units) of the SOC can use the remapping function (remapping function unit).

Figure 1:
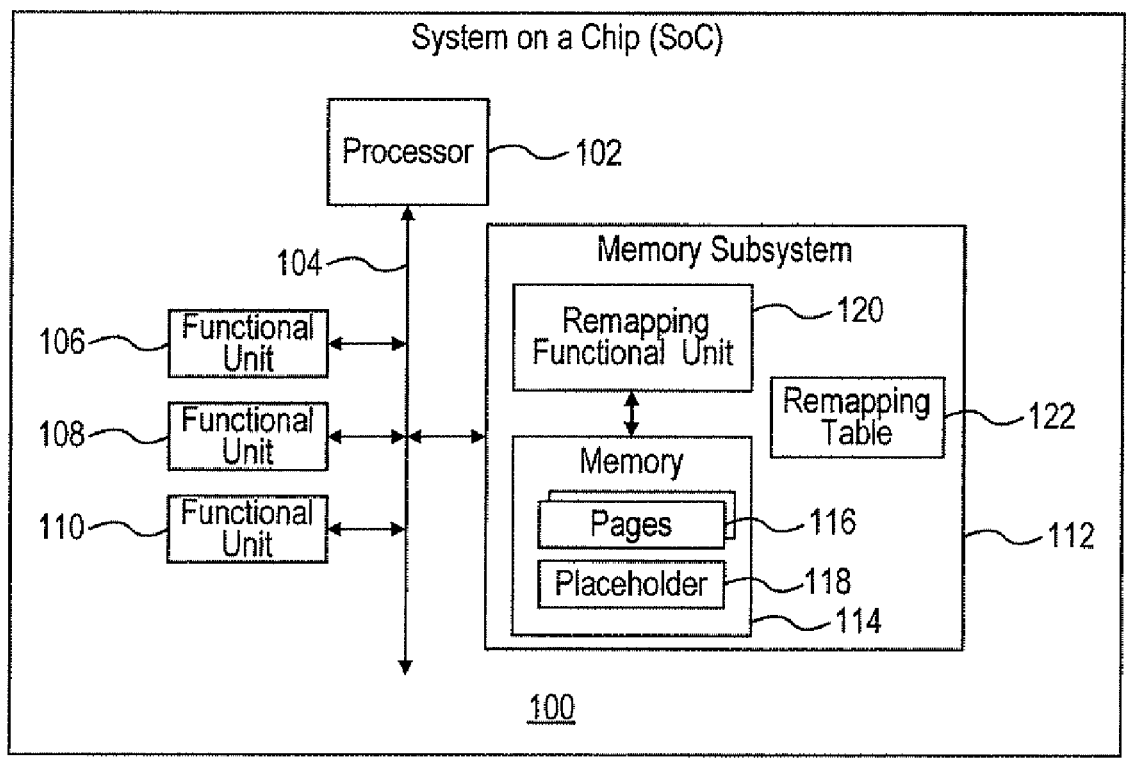
FIG. 1 is a high level block diagram of an example system on a chip (SOC)

FIG. 1 illustrates a high level block diagram of an example system on a chip (SoC) 100. The system 100 includes a bus 104 that communicatively connects a processor 102 and plural functional units 106, 108 and 110 to a memory subsystem 112 that performs memory remapping in accordance with an example memory remapping method of FIG. 2 below. Based on certain system requirements, more or fewer functional units may be provided in the SOC 100 than the functional units 106, 108 and 110. The memory subsystem 112 includes a memory 114, a remapping functional unit 120 and a remapping table 122. The processor 102 and the plural functional units 106, 108 and 100 may use the memory subsystem 112 to read data from and write data to memory 114. Memory 114 is divided into plural memory pages 116 that are adapted to store data. Memory 114 further includes a placeholder 118 adapted to store contiguous data remapped from the plural memory pages 116. Remapping table 122 provides a conversion of addresses within a remapping range between the plural pages 116 and placeholder 118.

Figure 2:
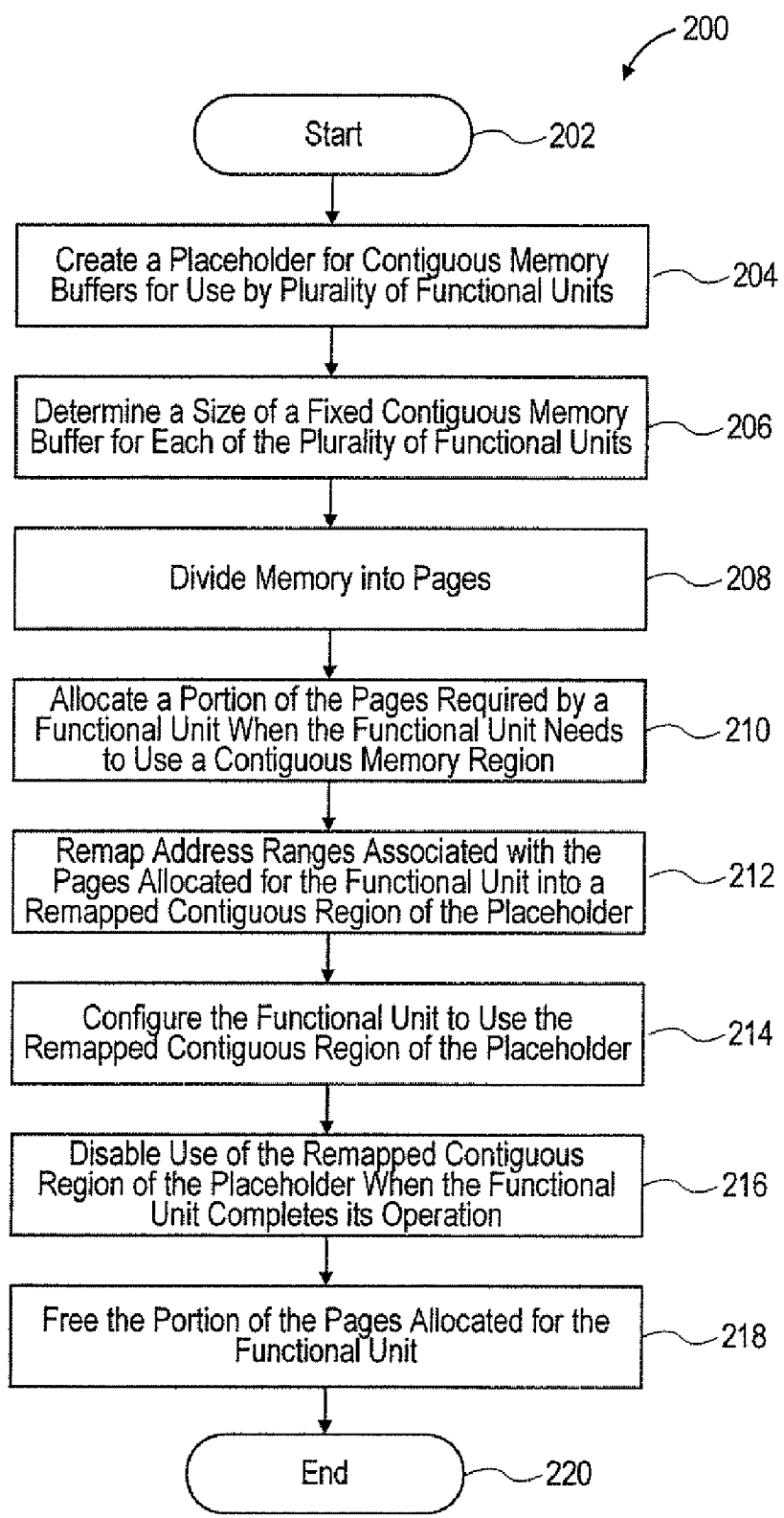
FIG. 2 is a flowchart of an example method of memory remapping in the SOC of FIG. 1.

FIG. 2 is a flowchart of an example method 200 of memory remapping in the SOC of FIG. 1. With such a remapping function present in the memory subsystem 112, the following operations can be followed to achieve on-demand allocation of contiguous memory regions in the placeholder 118 of memory 114 for use by subfunctions (functional units 106, 108, 110) of the SOC (non-CPU or CPU 102). The example remapping method 200 begins at operation 202.

At operation 204, a placeholder 118 is created for contiguous memory buffers to be used by the plural functional units 106, 108 and 110. This may be achieved by identifying or adding a region of memory subsystem address space which is not (or need not be) backed by true physical storage. This region of memory will act as the placeholder 118 for contiguous memory buffers used by subfunctions (functional units 106, 108 and 110) of the SOC 100. The size of the region should be large enough to accommodate the worst case buffer sizes from operation 206 below.

At operation 206, before the system 100 performs any actions which use memory buffers, based on many system-level parameters, it is determined how much each of the hardware functional units 106, 108, 110 will need for fixed, contiguous memory buffers. Determination of contiguous memory buffer size can be done at compilation time, or determinations can be done at run time before the functional units 106, 108, 110 are activated.

At operation 208, the memory is divided into a page pool of conveniently sized "pages". These pages will be allocated at run time on an as needed basis to satisfy needs for both contiguous memory buffers and general purpose, noncontiguous working memory.

At operation 210, a portion of the pages (obtained at operation 208) required by a functional unit 106, 108 or 110 is allocated. More specifically, at run time, as a particular subfunction (functional unit 106, 108, or 110) of the SOC 100 needs to use a contiguous memory region, memory pages from the page pool obtained in operation 208 are allocated in order to satisfy the amount of contiguous memory required. Of course the arrangement of these pages of memory is not likely to result in a contiguous memory region. This is OK.

At operation 212, the address ranges associated with the pages allocated for the functional unit 106, 108 or 110 at operation 210 are remapped into a remapped contiguous region of placeholder 118. Specifically, the memory subsystem remapping functional unit 120 is programmed such that the address ranges associated with the pages allocated at operation 210 are mapped into a contiguous region of the placeholder address space 118 reserved at operation 204. At operation 214, the SOC hardware subfunction (functional unit 106, 108, or 110) is configured to reference this remapped contiguous region of the placeholder 118.

At operation 216, when the SOC subfunction (functional unit 106, 108, or 110) is done with the contiguous memory region of placeholder 118, the remapping of this region of pages is disabled, and at operation 218, the allocated pages for the functional unit 106, 108 or 110 are freed. The example remapping method 200 ends at operation 200.

Current Embodiment

The system on a chip (SOC) 100 supports remapping with the memory subsystem 112 through the use of an on chip lookup table (remapping table 122). The general function of the remapping table 122 is to provide an arbitrary remapping for a subset of the input address space of the memory subsystem 112. For an input address which is within the remapping range, the input address is applied to the remapping table 122 which in turn provides a remapped address in placeholder 118 as output. The memory subsystem 112 then uses the remapped address rather than the input address when reading/writing from the memory 114.

The specific implementation within SOC 100 uses a 1024× 10 lookup table 122 (10 bits in, 10 bits out) as illustrated by the following pseudo-code. Please take care to note that in calculating the index to reference, the hardware does NOT subtrace MS_Remap_VBase from the incoming virtual address. Firmware must allow for this behavior in constructing the remapping table 122.

```
if     (MS_Remap_Control.Enable     &&     a
Vitrual>=Ms_Remap_VBase)
(
    pageIndex=aVirtual>>(10+MS_Remap_PageSize);     //
NOTE CAUTION ABOVE
    pageOffset=aVirtual     &     ((1<<(10+MS_Remap_PageSize))−1);
    pageNumber=LUT[pageIndex % 1024];
    aPhysical=MS_Remap_PBase+pageNumber<<(10+MS_Remap_PageSize)+pageOffset;
)
else
(
aPhysical=aVirtual;
}
```

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A method of allocating a memory in a memory subsystem of a system-on-a-chip (SOC) for use by a subfunction of the SOC, the method comprising:
   creating a placeholder for a plurality of contiguous memory buffers by reserving a region of memory address space, wherein the region of memory address space does not need to be assigned to physical storage;
   determining a size of a fixed contiguous memory buffer for each of a plurality of functional units of the SOC prior to the SOC performing any action that uses a memory buffer;
   dividing the memory into pages;
   allocating at least a portion of the pages based on an amount of memory required by a functional unit of the plurality of functional units when the functional unit of the SOC needs to use a contiguous memory region;
   remapping address ranges associated with the pages allocated for the functional unit into a remapped contiguous region of the placeholder; and
   configuring the functional unit to reference the remapped contiguous region;
   wherein the remapping is performed within the memory subsystem of the SOC.

2. The method according to claim 1, wherein the remapping is achieved through the use of a lookup table present in the SOC.

3. The method according to claim 2, wherein the lookup table is a 1024×10 lookup table.

4. The method of claim 1, wherein a size of the placeholder is at least as large as a combined size of the fixed contiguous memory buffers for each of the plurality of functional units of the SOC.

5. The method of claim 1, wherein the allocated pages do not result in a contiguous memory region.

6. The method of claim 1, further comprising disabling the remapping after the functional unit is completed and de-allocating the pages allocated for the completed functional unit.

7. The method of claim 1, further comprising allocating the pages at run time on an as needed basis for both contiguous memory buffers and noncontiguous memory.

8. The method of claim 1, wherein determining the size of the fixed contiguous memory buffer for each functional unit of the plurality of functional units is done at compilation time.

9. The method of claim 1, wherein determining the size of the fixed contiguous memory buffer for each functional unit of the plurality of functional units is done before the functional units are activated.

10. A system-on-a-chip (SOC) device comprising:
a central processing unit (CPU);
a plurality of functional units coupled to the CPU; and
a memory subsystem coupled to the CPU, the memory subsystem including a memory and logic to:
create a placeholder for a contiguous memory buffer by reserving a region of memory address space, wherein the region of memory address space does not need to be assigned to physical storage;
determine a size of a fixed contiguous memory buffer for each functional unit of the plurality of functional units prior to the SOC performing any action that uses a memory buffer, wherein at least one of the fixed contiguous memory buffers is not allocated prior to when a functional unit of the plurality of functional units of the SOC needs to use a contiguous memory region;
divide the memory into pages;
allocate at least a portion of the pages based on an amount of memory required by by the functional unit of the SOC when the functional unit of the SOC needs to use the contiguous memory region;
remap address ranges associated with the pages allocated for the functional unit into a remapped contiguous region; and
configure the functional unit to reference the remapped contiguous region.

11. The SOC device according to claim 10, comprising a lookup table for use in remapping the allocated pages.

12. The SOC device according to claim 11, wherein the lookup table is a 1024×10 lookup table.

13. The SOC device of claim 10, wherein the functional unit is a CPU executable functional unit.

14. The SOC device of claim 10, wherein the functional unit is a non-CPU executable functional unit.

15. The SOC device of claim 10, wherein the memory subsystem further comprises logic to de-allocate the pages for the functional unit after the functional unit is completed.

16. The SOC device of claim 10, wherein the memory subsystem further comprises logic to determine a size of the fixed contiguous memory buffer for each functional unit of the plurality of functional units based on multiple system-level parameters.

17. The SOC device of claim 10, wherein the memory subsystem further includes logic to remap address ranges for a subset of an input address space of the memory subsystem.

18. The SOC device of claim 17, wherein the memory subsystem further includes a lookup table to remap input addresses that are within the subset of the input address space.

19. A system-on-a-chip (SOC) device comprising:
a central processing unit (CPU);
a functional unit coupled to the CPU; and
a memory subsystem coupled to the CPU, the memory subsystem including a memory and logic to:
create a placeholder for a contiguous memory buffer by reserving a region of memory address space, wherein the region of memory address space does not need to be assigned to physical storage;
determine a size of a fixed contiguous memory buffer for use by the functional unit of the SOC, wherein at least a portion of the fixed contiguous memory buffer is not allocated prior to a memory request of the functional unit of the SOC;
divide the memory into pages;
receive an input address corresponding to the memory request of the functional unit of the SOC, the input address associated with at least one page allocated for the functional unit; and
selectively remap the input address into a remapped input address of a remapped contiguous region of the placeholder.

* * * * *

UNITED STATES PATENT AND TRADEMARK OFFICE
CERTIFICATE OF CORRECTION

PATENT NO.       : 7,484,070 B1                                              Page 1 of 1
APPLICATION NO.  : 11/032456
DATED            : January 27, 2009
INVENTOR(S)      : Walton et al.

It is certified that error appears in the above-identified patent and that said Letters Patent is hereby corrected as shown below:

Title Page item 57 in the Abstract, Line 1 reads, "A memory of allocating memory..." which should read, "A method of allocating memory..."

Column 1, Line 37 reads, "In other words, is not sufficient..." which should read, "In other words, it is not sufficient..."

Column 1, Line 67 reads, "...that is it possible to reconfigure..." which should read, "...that it is possible to reconfigure..."

Column 2, Line 44 reads, "...units 106, 108 and 100 may use the..." which should read, "...units 106, 108 and 110 may use the..."

Column 3, Line 41 reads, "...method 200 ends at operation 200." which should read, "...method 200 ends at operation 220."

Column 3, Line 63 reads, "...Vitrual>=Ms_Remap_VBase)" should read, "...Virtual>=Ms_Remap_VBase)"

Column 3, Line 65 reads, "(" which should read, "{"

Column 4, Lines 7 and 13 read, "(" which should read, "{"

Column 5, Line 23 reads, "...required by by the functional unit..." which should read, "...required by the functional unit..."

Signed and Sealed this

Sixth Day of July, 2010

David J. Kappos
*Director of the United States Patent and Trademark Office*